US011861736B1

(12) United States Patent
Reuss

(10) Patent No.: US 11,861,736 B1
(45) Date of Patent: Jan. 2, 2024

(54) SOCIAL-NETWORK COMMUNICATIONS WITH MUSIC COMPOSITIONS

(71) Applicant: Meta Platforms, Inc., Menlo Park, CA (US)

(72) Inventor: Nathan L. Reuss, Half Moon Bay, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1563 days.

(21) Appl. No.: 16/047,171

(22) Filed: Jul. 27, 2018

(51) Int. Cl.
*G06Q 50/00* (2012.01)
*G10H 1/00* (2006.01)

(52) U.S. Cl.
CPC ........... *G06Q 50/01* (2013.01); *G10H 1/0025* (2013.01); *G10H 2210/101* (2013.01); *G10H 2220/015* (2013.01); *G10H 2220/096* (2013.01)

(58) Field of Classification Search
CPC .................................. G06Q 30/0207–30/0277
USPC ..................................... 705/14, 319; 84/609
See application file for complete search history.

(56) References Cited

U.S. PATENT DOCUMENTS

2012/0269344 A1* 10/2012 VanBuskirk ............. H04K 1/00 380/255
2018/0151161 A1* 5/2018 Espeleta ................ G10H 1/361

OTHER PUBLICATIONS

Michael Schutz, Hearing gestures, seeing music: vision influences perceived tone duration, 2007 (Year: 2007).*

* cited by examiner

*Primary Examiner* — Tarek Elchanti
(74) *Attorney, Agent, or Firm* — Baker Botts L.L.P.

(57) ABSTRACT

In one embodiment, a method includes receiving, at a social-networking system an identifier corresponding to a post item stored in the social-networking system, and information indicative of a plurality of coordinated user gestures input into a composition interface control. The composition interface control comprises a plurality of interface targets each associated with a respective musical note. The information comprises target musical note and timing data associated with each of the user gestures. The method further includes translating the plurality of coordinated user gestures into a musical composition that includes musical notation reflecting the musical note and timing data of each user gesture. The method also includes associating the musical composition with the post item, and in response to receiving a request for the post item, formatting the post item and a graphical representation of each note in the musical composition for display in a user interface control.

20 Claims, 10 Drawing Sheets

SOCIAL-NETWORK COMMUNICATIONS WITH MUSIC COMPOSITIONS

TECHNICAL FIELD

This disclosure generally relates to music composition in social-networks.

BACKGROUND

Social-networking sites facilitate communication and interaction between countless users by ameliorating barriers to communication between communities. In fact, some social-networking sites have active users numbering in the billions across hundreds of different countries. One reason for the relevance of these sites and intense interest among users in such a large number of regions is that the entities generating content (e.g., users of the social-networking site, groups, companies, affinity groups, etc.) are distributed throughout the world. As the sheer number of users and geographic scope of these sites expands, fostering communication between diverse users has become increasingly important. Social-network operators often accommodate communications by an international user base through internationalization and localization strategies. These strategies allow users from diverse backgrounds and communities to communicate in a language and interface that is most comfortable or convenient to them. For example, this may include translating content into the most relevant language for a given user. Specific customs, traditions, and languages can be accommodated by the localization strategy, thereby improving the user experience by providing a custom interface for each region and increasing user engagement. In addition, internationalization and localization fosters the spread of new ideas and collaboration between communities. For example, a website operator may create custom user interfaces for each individual community that is expected to view the website. An appropriate localized interface can be selected for display to the user (e.g., such as by selecting the localized page for a community associated with the known location of a requesting IP address). For example, the operator may customize language, colors, look and feel, and other interface objects for accessibility by members of the target community. In fact, site customizations and other initiatives that increase international adoption has become a focus of investment for website operators, and particularly social-networking operators as they look to expand their user base to increase the number of active users. However, certain methods of communication with near universal applicability remain largely untapped by website operators.

SUMMARY OF PARTICULAR EMBODIMENTS

In particular embodiments, an identifier corresponding to a post item stored in a social-networking system, and information indicative of a plurality of coordinated user gestures input into a composition interface control is received at a social-networking system. The composition interface control may include a plurality of interface targets each associated with a respective musical note. For example, the composition interface control mimics the appearance of an octave of piano keys, the strings over the bridge of a guitar, a set of drums, or the like. The information comprises target musical note and timing data associated with each of the user gestures. For example, the information reflects the keys that a user presses on a graphical piano key interface, as well as the timing, duration, syncopation, and other attributes of the user's input gestures. The method further includes translating the plurality of coordinated user gestures into a musical composition that includes musical notation reflecting the musical note and timing data of each user gesture. The method also includes associating the musical composition with the post item, and in response to receiving a request for the post item, formatting the post item and a graphical representation of each note in the musical composition for display in a user interface control.

In particular embodiments, the display interface control allows users to add to or modify the displayed musical composition. For example, a user may wish to add a drum line to an existing musical composition consisting only of piano notes. As another example, a user may wish to modify the ending or tie in another rhythm or melody into the existing musical composition. A user may be inspired by a post and wish to incorporate his or her feelings through musical expression. The user interface displaying the post allows a user to compose written messages as well as musical compositions. The interface may also allow a user to modify his or her recorded composition.

In particular embodiments, the composition interface control allows customization of various acoustic properties of the music being composed. For example, an instrument selection interface allows a user to select one of a plurality of instruments. Acoustic properties of the recorded music can be tuned to reflect the sound of the selected instrument. For example, the blare of a horn or the whistle of a flute can be associated with the notes indicated by the user's input gestures. As another example, staccato, allegro, or other indications of tempo, volume, or other acoustic properties can be indicated to modify the composition and corresponding reproduction.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
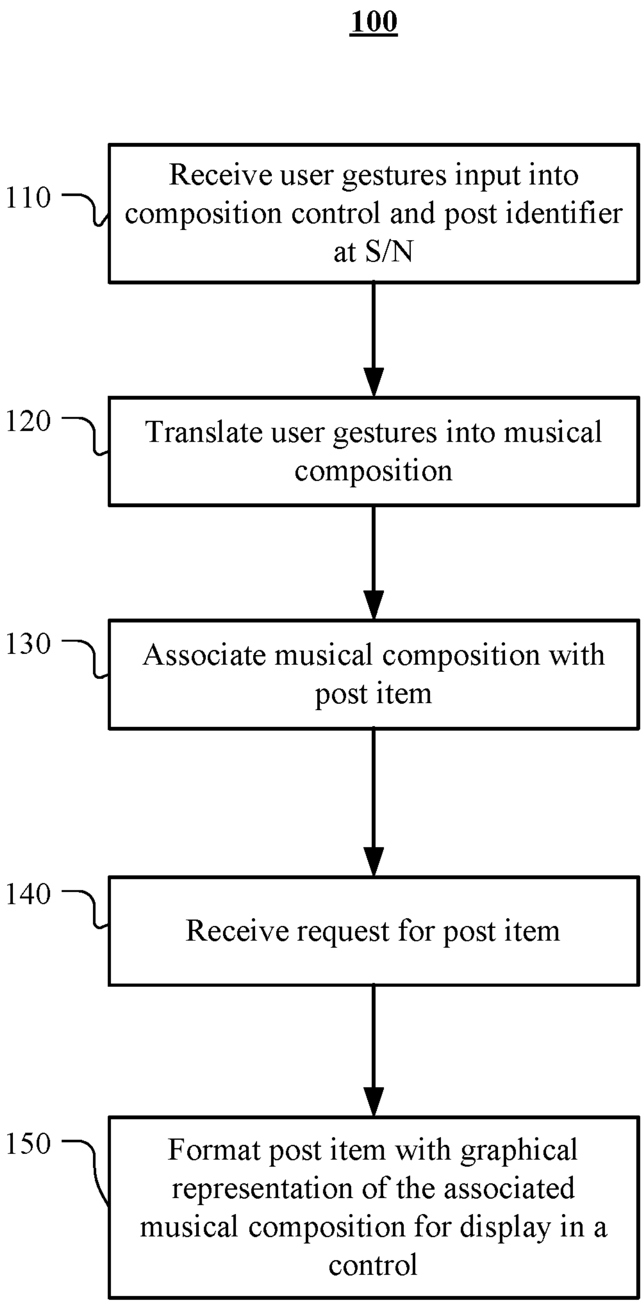
FIG. 1 illustrates an example method for facilitating social-network communications with music compositions.

Social network operators strive to accommodate a diverse set of users. As discussed above, one way to accomplish this is to provide internationalization and localization strategies that facilitate communication between users in hundreds of different languages throughout the world. This allows users from diverse backgrounds to utilize the social networking platform to communicate with others that speak different languages and fosters the spread of new ideas and collaboration. In fact, automatic language translation engines, site customizations, and other initiatives that increase international adoption have become a large focus of investment for operators.

However, despite its near universal appeal and intuitive nature, music is often neglected as a communication medium. For example, music can be used to communicate a host of human emotions, reactions, announcements, time periods, and senses. For example, a melody performed on an electronic synthesizer over drums nearly instantly conjures images of the 1980's to the listener. As another example, low stacked chords instill a sense of fear in the listener. Upbeat fast rhythms conjure images of happiness to the listener. As yet another example, the happy birthday melody proclaims happy birthday to every listener that hears it. Well-known melodies can express feelings of celebration, party, congratulations, sorrow, fright, or even express condolences to the listener, in addition to a nearly unlimited set of additional expressions and feelings. These musical associations are understood by a wide variety of cultures and do not require translation to convey the intended message.

In addition, music can be used to accentuate other communications. For example, dark dreary low chords accompanying an opinion article can express that a user disagrees with the opinion expressed in the article, even without sending a single message to that affect. A happy light melody can express happy sentiments over a communication. Moreover, music can enhance the receiving users experience of the communication. For example, music can increase suspense or introduce feelings of celebration or fear in the listener, especially when timed with or otherwise coordinated with a visual message.

Whether as a standalone communication, or accompanied with other visual communications or expressions, mechanisms for harnessing the powerful communication medium of music in social-networking environments remain largely untapped. The teachings of the present disclosure aim to harness music as a communication medium by enabling users to draft musical compositions tailored to each user's musical sophistication. A music composition interface enables recording or drafting of original musical works and enables reproduction and performance of drafted compositions. These compositions can then be embedded in musical messages just as written words are. In addition, compositions can be associated with posts or stand alone as posts on their own without accompaniment. In certain embodiments, a user interface is provided in a social-networking application or website that enables users to compose, record, edit, and share music with others.

For example, a typical social-networking application may contain a news feed that contains stories, photographs, videos, and other communications posted by related users. The social-network may also have a messaging service that allows users to communicate to a more limited set of users. The news feed may have an interface that initiates a composition process that provides for the creation and sharing of content with other users. The messaging application provides a similar interface to allow a user to compose messages including text, video, audio, animations, stickers, emoji's, drawings, and the like with other users in a messaging session.

In certain embodiments, the composition interface includes an interface for composing an original music composition. For example, selection of a button associated with composing a musical message displays a piano keyboard that is scaled to accommodate a suitable number of keys within a given screen. For example, the user interfaces can be scaled up or down depending on whether the user is using a mobile phone, IPAD, desktop computer, or any other computing device that is used as an interface to the social networking application or website. For example, on a mobile phone held in a portrait orientation, a single octave row of piano or keyboard keys starting at middle C is displayed, but when the user turns the device to the landscape orientation, additional display area is provided for the composition interface to display additional keys such as, for example, a second octave of keys corresponding to the bass clef. As another example, several rows of piano keys can be displayed in a single composition interface. As another example, interface buttons are provided to switch between octaves, such as by toggling between treble and bass clefs.

In certain embodiments, the music composition interface allows users to input gestures corresponding to musical outputs such as sound and musical notes. The musical notes and sound can be recorded and displayed on a composition clef. For example, as the user gestures by touching display areas corresponding to particular keys on a piano interface, the corresponding note is recorded on a composition clef displayed. In certain embodiments, the clef can record timing, force, and other attributes of the input gesture. The composition clef can denote these different presses with the appropriate notes and modifiers, such as by indicating half or whole notes, slides, staccato, allegro, andante, presto, crescendo, and various other composition syntax elements.

In certain embodiments, other instruments can be displayed in the music composition interface. For example, a virtual guitar, virtual drum set, virtual harpsichord, or any other conceivable instrument interface can be provided. For example, one guitar interface may provide a virtual neck and wires that allow a user to strum and hold chords on a neck. The achieved notes may be played allowed and recorded on the composition clef In certain embodiments, the music composition interface may allow users to layer in various instruments, external tracks, and voices to create a layered composition.

With reference to FIG. 1, a flow-chart 100 describing a method for composing and communicating with composed music in a social-networking system is illustrated according to a non-limiting embodiment of the present disclosure. At step 110, a social-networking system receives a series of coordinated user gestures that are input into a composition control interface. The social-networking system also receives a post identifier that identifies a post in a social-networking system. For example, the post identifier may identify an existing post or a new post that is being created in the music composition interface. For example, when the user creates a new post, a new post identifier can be created by the social-networking system and associated with the new musical composition and other media elements from the post.

Figure 2:
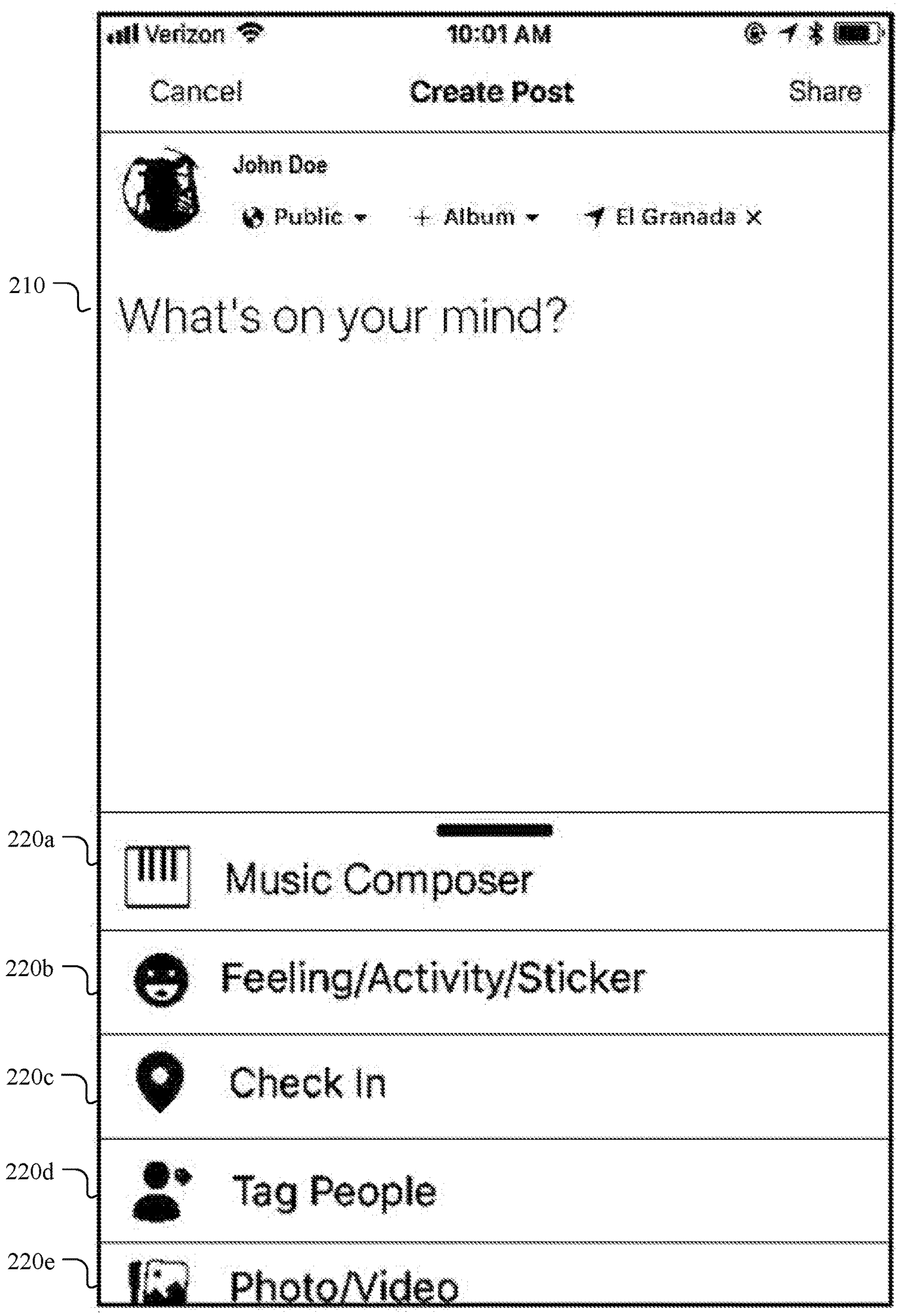
FIG. 2 illustrates an example interface for initiating a musical composition for distribution in a social-network environment.

In describing embodiments associated with the flow-chart 100 in FIG. 1, reference is now made to accompanying FIGS. 2-5. With reference now to FIG. 2, an example user interface is displayed that allows a user of a social-networking system to create content for sharing in the social-networking system. This particular interface is designed for interacting with a mobile device, though the teachings of the present disclosure fully contemplate use at any variety of interfaces, including virtual reality, desktop computers, mobile phones, tablets, and the like. For example, the user may type a message to create a post by selecting area 210 with an input gesture. The user may compose a multimedia message by selecting any one of the selectable target areas illustrated for exemplary purposes in selectable target areas 220*a-e*. For example, the user may share or post a GIF, sticker, emoji, or photograph by selecting areas 220*b* or 220*e*. The user may check in to a location and share the user's location with a selectable set of friends by selecting the check in area 220*c*. As another example, the user can tag people in the content being composed by selecting the area 220*d*.

Figure 3:
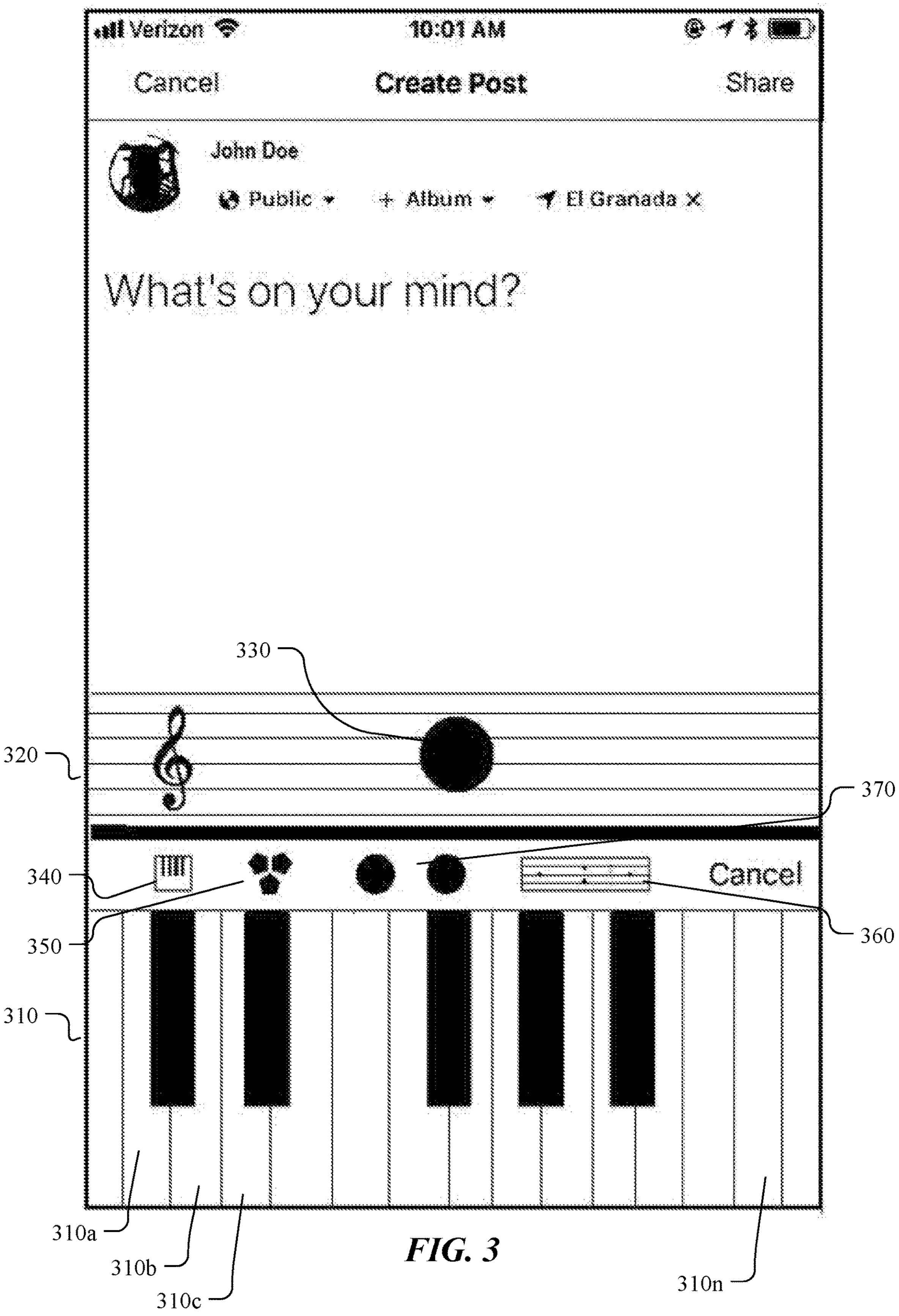
FIG. 3 illustrates an example interface for composing and sharing a music composition in a social-network environment.

In certain embodiments, a user may wish to compose a message or post that consists in whole or in part of a piece of original composed music. In this case, the user would select the target selectable area 220*a* with an input gesture. In certain embodiments, such a selection may result in display of the interface shown in FIG. 3. FIG. 3 shows an example user interface control for composing music as referenced in step 110 of FIG. 1. The user may create an original work of music that is recorded in musical notation and composed by the social-networking system. For example, the user may use the selectable target area 310, which is illustrated in the present example as individual keys in one octave of a digital keyboard. The user may interact with the interface by gesturing in the form of tapping, touching, swiping, or otherwise interacting with the selectable target areas shown in 310. For example, the user may tap individual keys 310*a-n*. In certain embodiments, the interface may output a corresponding sound for each note input by the user. For example, the sound may mimic the acoustic properties of the selected instrument. While the user is inputting gestures and interfacing with the selectable target areas shown in 310, a system records the corresponding notes and other information regarding the user input. For example, the system may record the length or duration of each input gesture associated with each key. If the interface is equipped with the means to do so, the system may also determine the strength of the user input gesture. For example, if the user inputs a forceful input gesture, the system may note that. Likewise, the system may determine a soft or delicate input gesture and store information regarding that input.

In certain embodiments, a practice mode is initialized by default when composing a music message. For example, when the user selects the music composer interface button 220*a* from the composition screen in FIG. 2, the interface in FIG. 3 is displayed but no recording is enabled. The practice mode can be denoted by displaying the record button 330 in the staff interface 320. For example, the user can practice the music he or she wishes to compose by gesturing in the relevant areas of area 310. Corresponding sounds are produced as input by the user but the system does not begin composing the music until the user selects recording button 330.

In certain embodiments, the user can select a wide variety of instruments to "play" by gesturing or interacting with selectable target areas displayed in the interface. For example, with reference to buttons 340, 350, 360, and 370, the user can change from a default "piano" interface to various other interfaces such as drums, record or digital turntables, or a guitar. The input target areas 310 may change with each target instrument selected. For example, when the drums button 350 is selected, the target interface area 310 changes to display a series of drum pads. The user can interact with each drum pad to output a sound. Recording and composition as described below follows in much the same manner based on the user's desired instrument selection. While the teachings of the present disclosure refer to notes, the embodiments described herein are equally applicable to percussive melodies which can also be described as notes with timing information. Sound information can also be stored to indicate which type of drum the user interfaced with for reproduction that mimics that particular type of drum.

In certain embodiments, the user can select a wide variety of attributes of the desired instrument. For example, with reference to the piano keys 310 illustrated in FIG. 3, the user can select the octave associated with the set of keys. In certain embodiments, the user can rotate the interface device to display a wider array of keys. For example, the treble and base clef octaves of keys can be displayed if the user rotates the display device to a horizontal orientation. The user can swipe the interface keys 310 left or right to display the next higher or lower octave of keys. In certain embodiments, the clef displayed in staff 320 changes based on the octave selected by the user.

In certain embodiments, when the user wishes to end practice mode and start composing a musical message, the user presses the record button 330 and begins gesturing into the selectable target areas associated with one or more selected instruments. The music (or absence of sound/notes) in the form of one or more of input gestures, notes, and/or the sounds produced therefrom begins recording when the user selects the record button. In certain embodiments, a musical note is displayed in the staff 320 that corresponds to each key selected by the user. The duration of each note is indicated in the staff based on the length of time that the user holds each key (by holding the input gesture). For example, a flagged note or linked notes can express long input key depressions. Those of ordinary skill in the art will appreciate that while "keys" are discussed in the context of the present disclosure for ease of reference and consistency with the illustrated figures, the embodiments referenced herein apply equally to the wide variety of other instruments.

In certain embodiments, the notes displayed in the staff are responsive to the user's input gestures. For example, this may allow the music composer interface to teach users how to compose music themselves. As the user sees the corresponding notes appearing in the staff, the user associates the key with that note and learns to draft or compose music. This operation is discussed more fully below with reference to the music composition tutoring mode of operation.

In certain embodiments, a user can edit various aspects of a recorded musical composition. For example, the user can modify the notes, the length of time that each note is played, the duration of the composition (e.g., by cropping the beginning or end of the composition) and other aspects of the composition with the composition interface. For example, the user can tap in the staff 320 and swipe left or right to access the notes for a particular piece of the composition. In certain embodiments, the user can pinch to zoom in or out of the staff to expand or contract the scale by which the viewer views the composition. For example, the user can zoom out of the staff 320 to view an entire 3 minute composition in one interface. The user can zoom into a particular part of the staff to enlarge the musical notation associated with a particular part of the composition.

Returning to FIG. 1, at step 120 the system translates the input gestures into a music composition. In certain embodiments, the system translates each individual input gesture into a corresponding expression in musical notation. The timing information is also derived from the input gesture information to denote the timing with respect to each musical note recorded on a staff. The system may also translate the other associated information into appropriate musical notation. For example, the system may determine that the user gestures are becoming more forceful in ascending order, and may interpret this as a crescendo in volume. The system may denote a crescendo symbol in the music composition. Similarly, the system may interpret gestures to have been input in a fast, light, repeating manner of short duration. These gestures may be associated with a staccato musical notation, and the appropriate notation can be applied or denoted in the composition, In addition to the translation and composition of the written musical notation, the system may also record the resulting sound created by "playing" the recorded music. For example, the interface may record the sound produced by the user's live input gestures input into the interface. Additionally or alternatively, the composed music composition can be replayed to produce the same and/or a similar resulting music composition. For example, like the rolls of a player piano, the recorded music composition can be digitally replayed by digitally reproducing each note of the recorded composition at the intensity and with the style that the user input for each gesture while recording. For example, this "style" information (e.g., the vigor or strength, duration, and other input information) can be recorded along with the associated note for each user input gesture. This information can be used to guide the digital reproduction of each recorded note. In certain embodiments, this information is stored with the musical composition to enable realistic playback that reflects the composer's unique style.

Returning now to FIG. 1, at step 130 the system associates the musical composition with a post item. The post item may be new or existing. For example, in the example shown in FIG. 2, the system creates a new post item with a new post identifier for the composition. In certain embodiments, the system presents an opportunity for a user to compose an original music composition in response to or for an existing post item. For example, in the example shown in FIG. 4 a post is displayed to a user, such as in a traditional news feed or other post aggregation. However, in this interface, an interface button 420 provides the user with an option to compose a musical message that can be in response to or part of the original post item 410.

Figure 4:
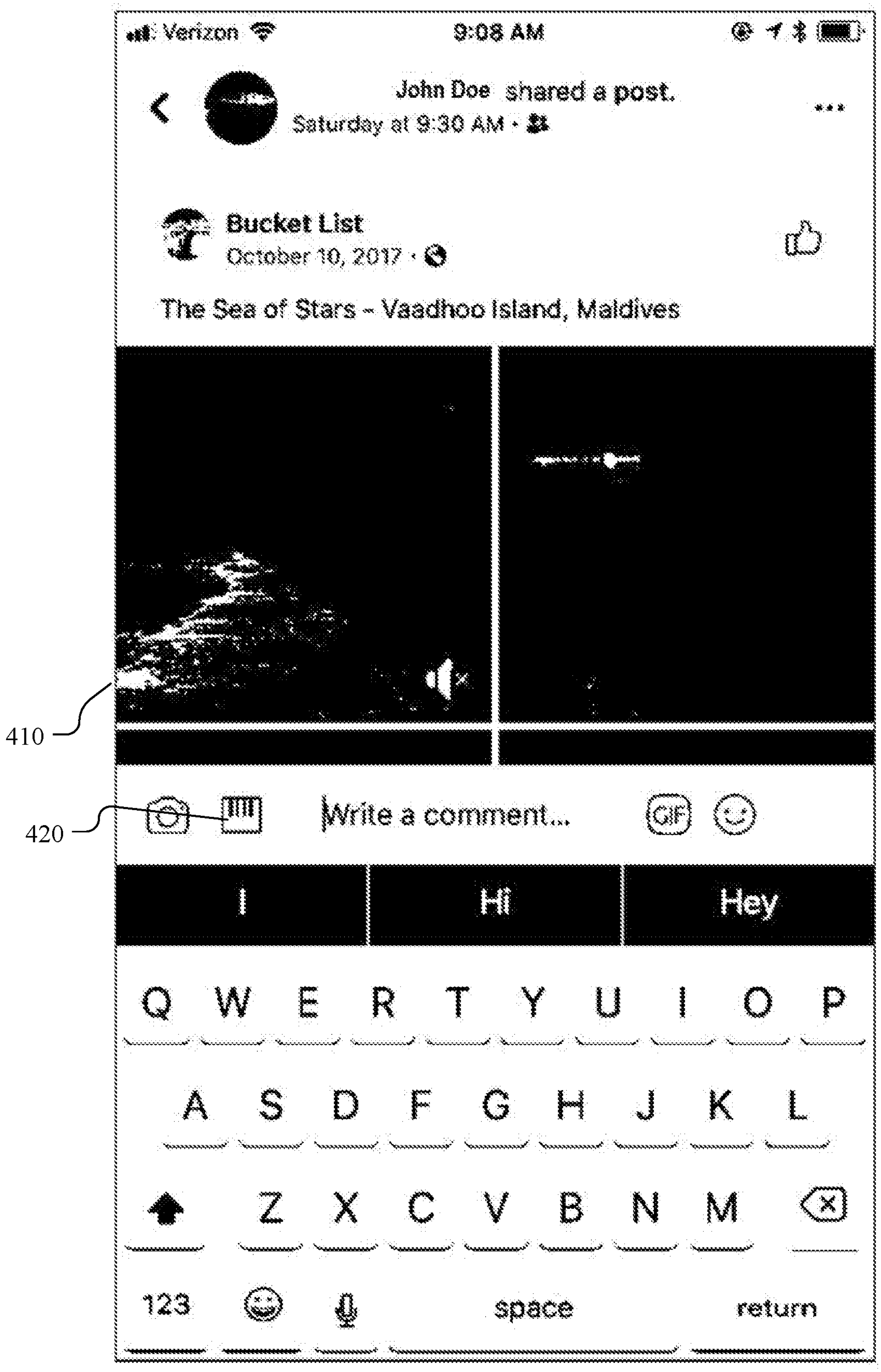
FIG. 4 illustrates an example post containing images and a musical composition and providing an interface for replying to or editing a shared musical composition.
Figure 5:
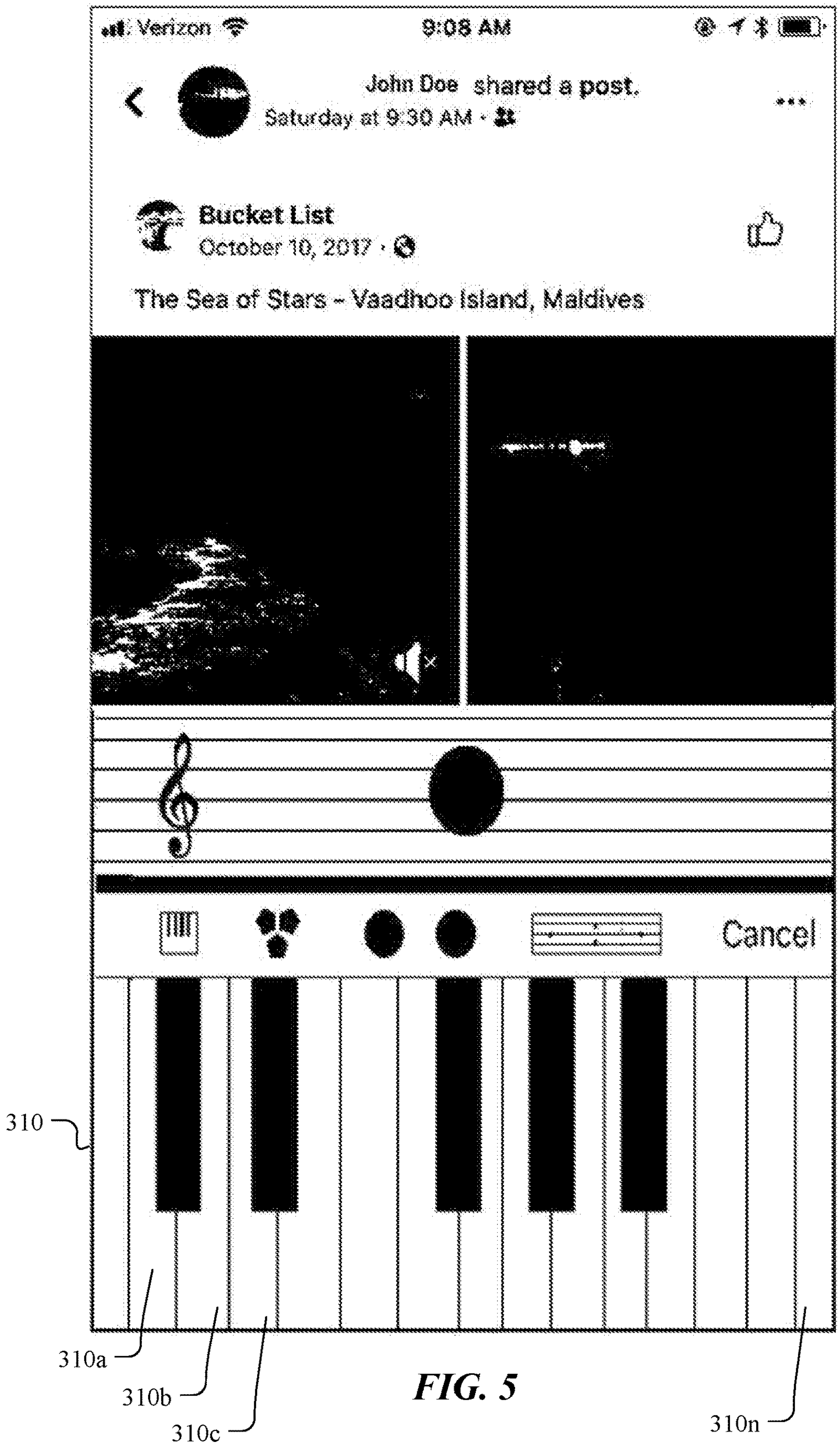
FIG. 5 illustrates an example interface for replying to or editing a musical composition shared in a post.

In certain embodiments, when the user selects interface button 420, an input control interface for composing a music composition is displayed, such as the example interface shown in FIG. 5. This interface may be similar to or the same as the new composition interface illustrated in FIG. 3, but is now displayed in relation to the post item (410 from FIG. 4). This interface allows a user to compose a message that is inspired by, relates to, or enhances an underlying post item. In addition, the interface allows the user to express an opinion, or enhance a viewer's experience of a post item by composing an original music composition for display with the post item. In certain embodiments, the interface allows a user to comment on a particular post. For example, a musical composition displayed as a comment is not overlaid with or displayed with the original post, but is instead displayed below the original post. For example, the comment does not suggest an affiliation between the agent posting the original post and the agent posting the musical comment.

In certain embodiments, the musical composition can be a "reaction" to the original post. For example, similar to "liking" or reacting with an "emoji" to a particular post, a musical composition can express the composer's reaction to a given post. "Reactions", like comments, also do not convey an affiliation with the original poster but instead clearly denote that the message conveys a summary of the viewer or recipient's response to the posted material. In certain embodiments, user interfaces are created to display posts in a news-feed style aggregation in which "reactions" are played live as they are posted to a particular post. For example, while a user is viewing post 410 from FIG. 4, original music compositions that other users compose and post in reaction to the post 410 can be played. In addition to other emoji or "liking" style emojis, the musical compositions can also be displayed. For example, as people react with musical notes input into their interface composition keyboards, the musical notes may pop up over the post. For example, the live reactions may appear as a series of notes that appear to float over the post. By way of example, as the user in FIG. 5 reacts to the post, he or she inputs gestures corresponding to keys 310*a-n*. Not only are the gestures recorded by the system, but in certain embodiments, the notes are individually live streamed to other users who are viewing the post. The individual notes input by the user are displayed as floating on top of the post or on a staff underneath the post. The notes may scroll across the staff for some or all of the viewers viewing a post as they are played by the composing user.

Figure 6:
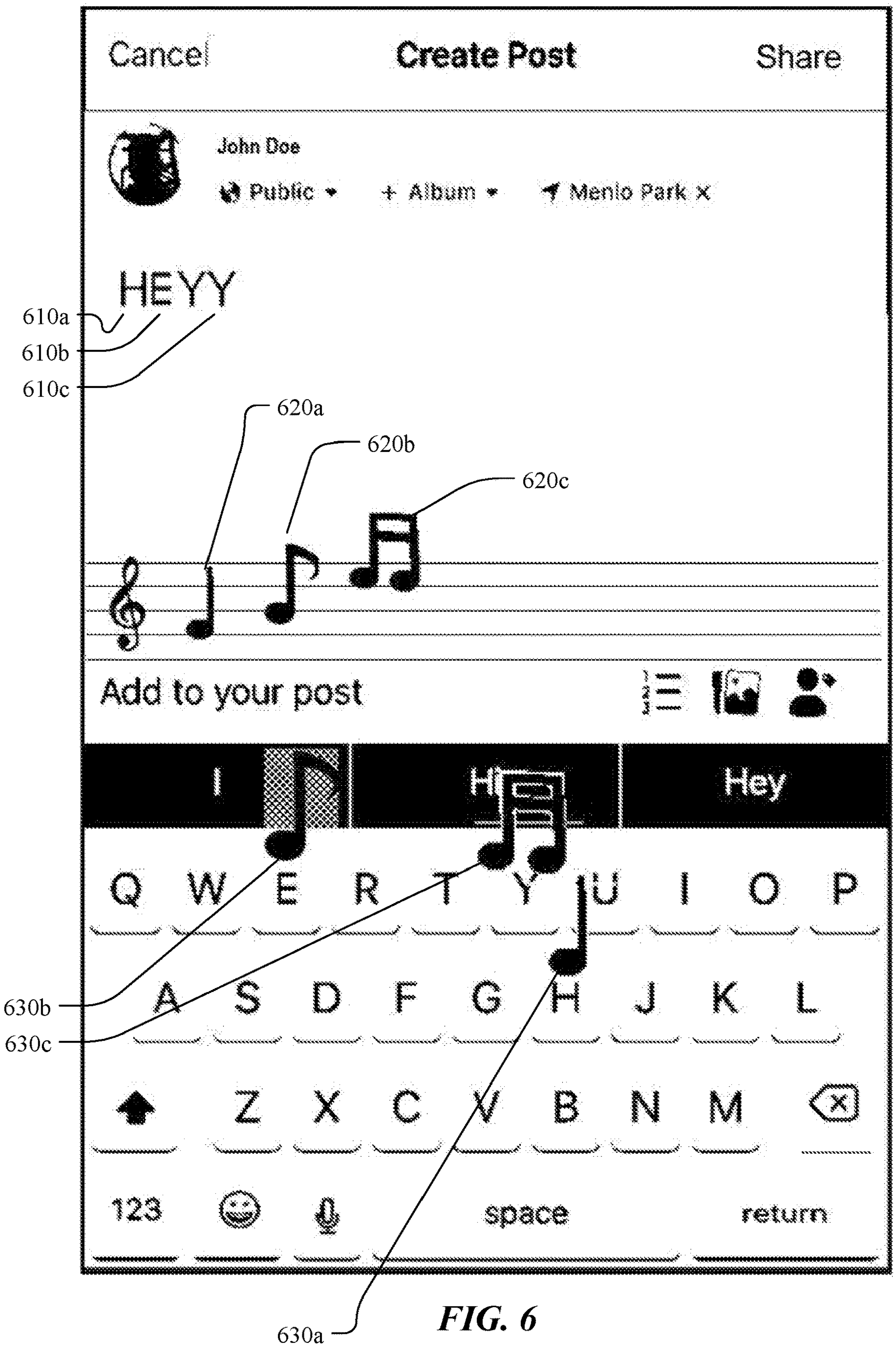
FIG. 6 illustrates an example interactive interface for composing a message with musical accompaniment in the form of assigned musical notes for alphanumeric letters.

Returning now to FIG. 1, at step 140 a request for a post item is received and at step 150 the post item is formatted for display with a graphical representation of the associated musical composition in a user interface control. For example, with reference to FIG. 4, a post 410 is displayed in a graphical user interface. The post 410 is associated with a musical composition as indicated by the sound icon in the lower right corner of the first image. In certain embodiments, the user may click the sound icon to modify the post display to play the associated composition and/or display the musical notation associated with the composition. For example, the staff with notes 620*a-c* from FIG. 6 can be displayed beneath the original post 410 while the musical composition is played. In certain embodiments, the notes 620*a-c* may scroll across the staff as time progresses and as each note is played. For example, each note may be played as it crosses some axis in the screen, such as the center point. This indicates to the user which note is being played and further assists in teaching the user to associate given notes with the corresponding musical notation.

In certain embodiments, the music composition interface allows the user to share his or her composition with control over the format of the output and audience. For example, the user may wish to make the composition private to only his or her friends. The user may wish to only share the sheet music version of the composition, or only share the audio version. The user may wish to overlay the composition over a related post. The user may wish to allow friends to contribute to the musical composition post by adding additional layers or editing the content of the composition. Each of these variables can be configured by the user at post time or in privacy settings.

In certain embodiments, the music composition interface provides for customizing traditional communication mechanisms, such as by overlaying an original piece of composed music over, for example, an emoji. The system may store compositions for particular characters or emojis and replay the composition during transmission of the character with virtually limitless personalization possibilities for fixed characters. For example, a set of frequently used compositions can be stored in a user's "music roll" that is similar to a camera roll of recent photos. For example, with reference again to FIG. 6, an interface for typing a message and associating a musical note with each typed character in the message is illustrated in accordance with a non-limiting embodiment of the present disclosure. In the illustrated embodiment, the word "HEYY" is being associated with a musical composition. In certain embodiments, each character in the alphanumeric keyboard can be associated with an individual musical note. As the user types the message, the musical note for each character pops up out of the interface displaying the key in live response to the user typing the message.

Additionally or alternatively, each note 620*a-c* corresponding to each typed key 630*a-c* is added to the staff with the timing indicated by the timing of the alphanumeric key press. For example, if the user waits a long time between pressing "H" and "E", the timing on the staff may reflect this pause in displaying associated notes 620*a* and *b*. In certain embodiments, the letters 610*a-c* can be color coded to correspond to color coded notes 620*a-c*. For example, a green note 630*a* pops out of the alphanumeric keyboard interface while a green note 620*a* is displayed on the staff and a green "H" character 610 is displayed in the message composition interface. In certain embodiments, an interface is provided for associating each character in a message or each character, icon (emoji), sticker, or image, with a unique musical note or message. For example, the user can assign notes, melodies, or compositions to a particular character or emoji. This enables users to fully customize a fixed set of characters with original music compositions. In certain embodiments, an enhanced interface for displaying the associated musical compositions can be provided by synchronizing display of the musical notes being played with animations that appear to show the notes popping out of the screen as each note is being played. In certain embodiments, this may be referred to as "text songs" to reflect the idea that musical compositions can be created by merely texting a friend when each key has an assigned musical note.

In certain embodiments, instrument localization defaults to a native virtual instrument for a new geographic area. For example, if a user is traveling to Berlin, a virtual accordion can be displayed as the default virtual instrument in the music composer interface (the accordion was invented in Berlin). In certain embodiments, the location services provided by the user's device or user preferences or profile can be consulted in determining a location for the user. When the user indicates a desire to compose a music interface, the default instrument or set of instruments for that location can be displayed. Thus, unlike with custom language keyboards, which require knowledge and understanding of the target language before any communications can be created, the music interface allows people from different backgrounds to communicate in the instruments associated with foreign culture and create music compositions.

Figure 7:
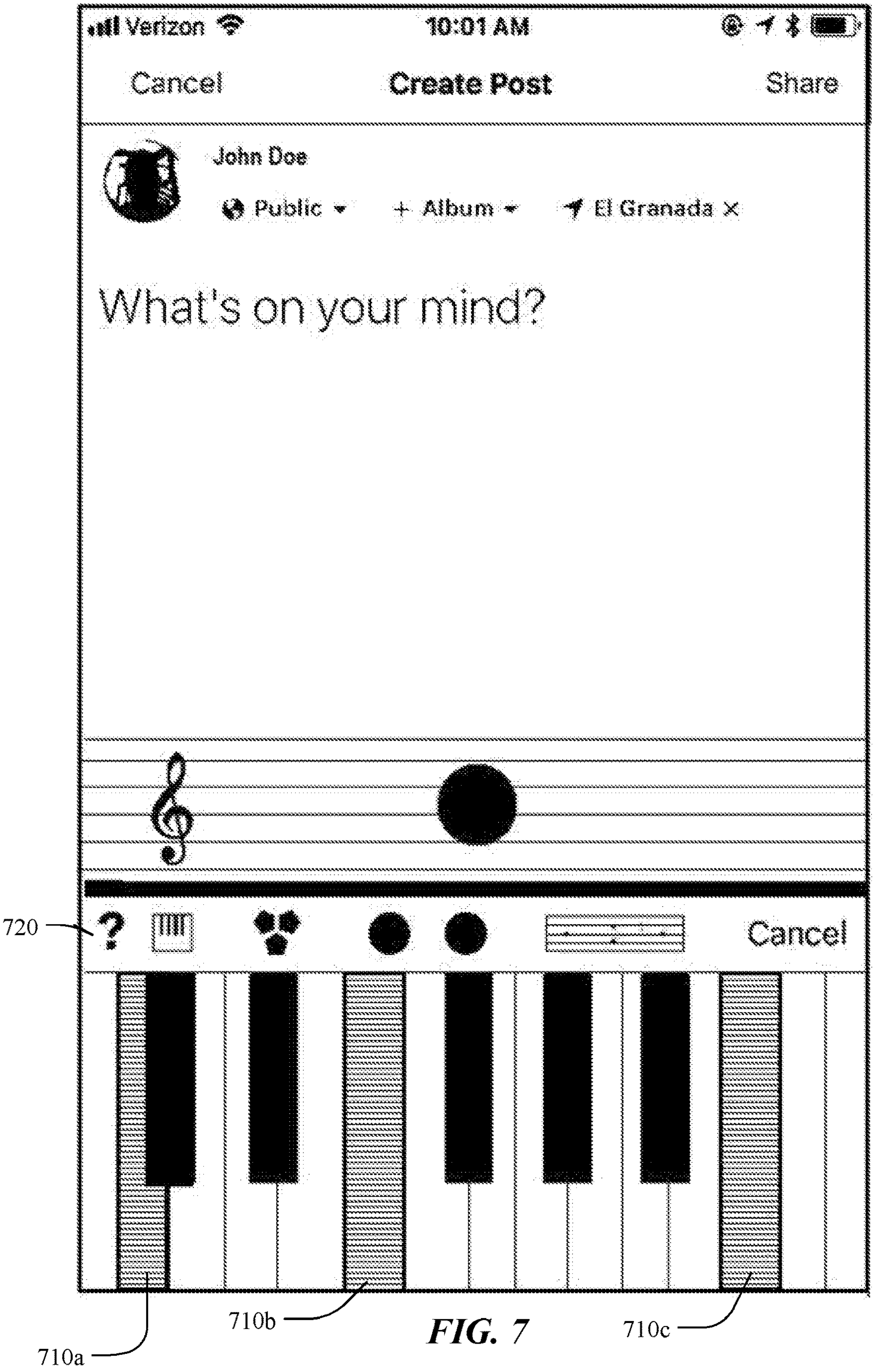
FIG. 7 illustrates an example music tutor interface for instructing a user how to play an instrument and providing an interface for recording a composition.

In certain embodiments, the system provides an interface for a "music tutor" mode or "learning" mode that instructs users to play and compose music using a similar composition interface. One example interface for a tutor mode is illustrated in FIG. 7. For example, users can import purchased popular songs to see a scaled-down rendition of the song and learn how to play the song using virtual instruments.

In certain embodiments, individual keys 710*a-c* of the tutor interface light up to teach the user how to play a particular song. For example, in the music composition interface, such as that described in connection with FIG. 3 above, a tutor mode button 720 (from FIG. 7) is provided that enables a user to toggle tutor mode on or off. The tutor mode enables a user to select a pre-recorded song or composition and instructs the user how to play the song by lighting up a series of keys 710*a-c*. The user can choose to record the user's rendition of the song, and share the created composition as a post, comment, reaction, message, or other communication. This enables even new musicians to add custom flare or emotion to any song and share it with their friends.

In certain embodiments, an interface is provided for selecting a song or musical composition for use in tutor mode by typing in the first letters of the song in a normal message composition screen. As the system recognizes the characters input are spelling a song, the auto-complete area of the interface can indicate that the song is available for use in tutor mode. When the user selects the auto-complete target, the tutor mode is engaged for that song.

Figure 8:
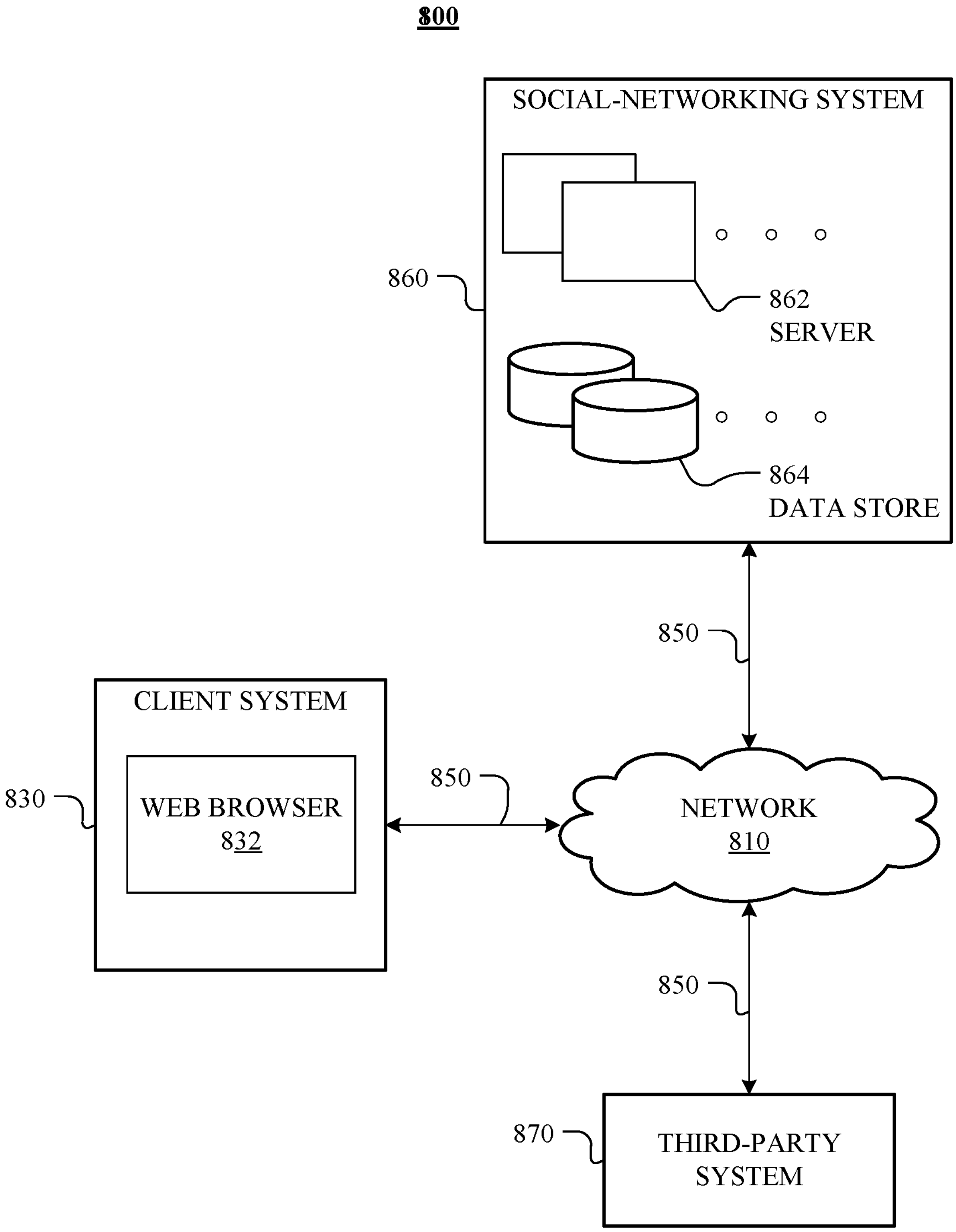
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes-which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term “friend” may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
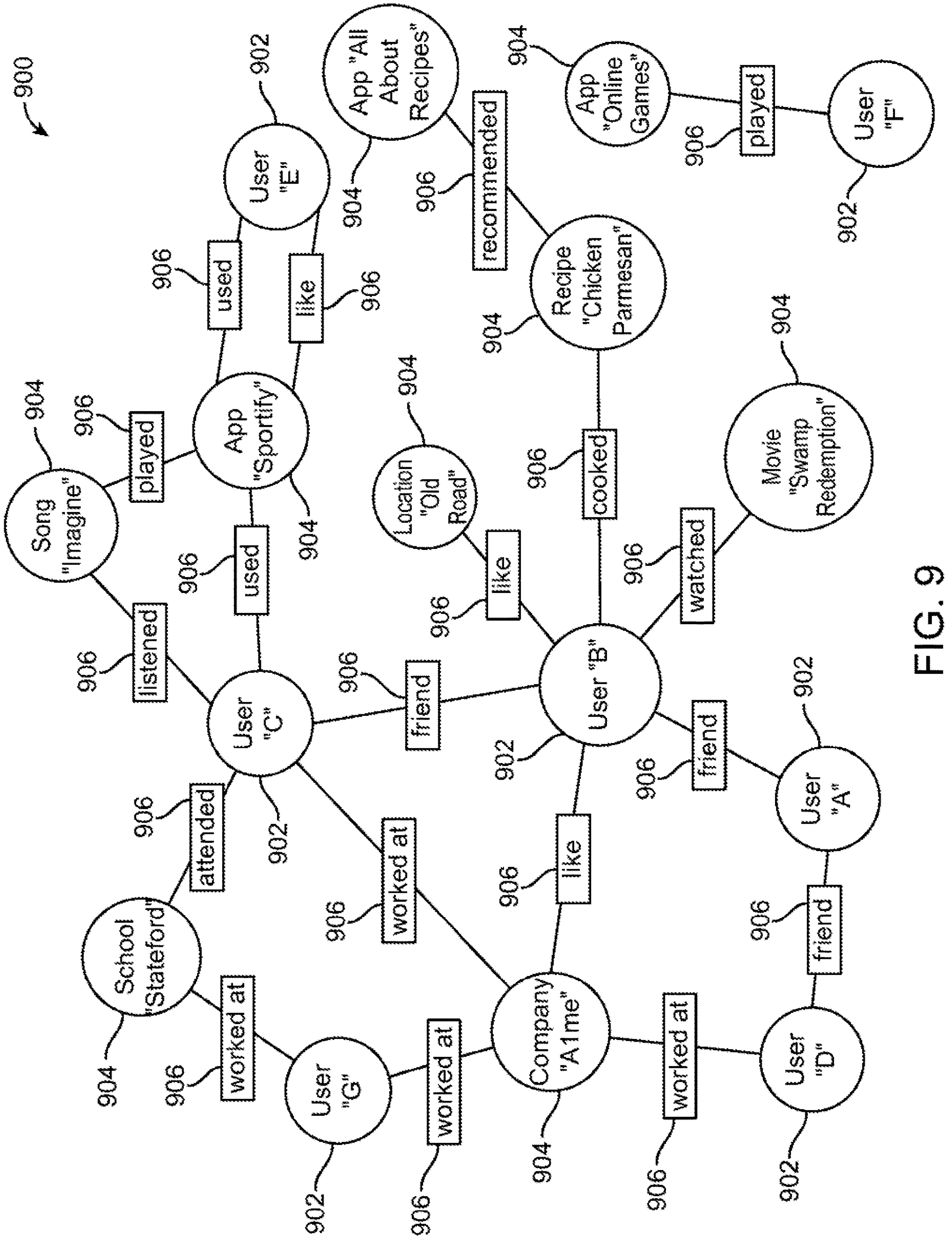
FIG. 9 illustrates an example social graph.

FIG. 4 illustrates example social graph 900. In particular embodiments, social-networking system 860 may store one or more social graphs 900 in one or more data stores. In particular embodiments, social graph 900 may include multiple nodes-which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904).

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
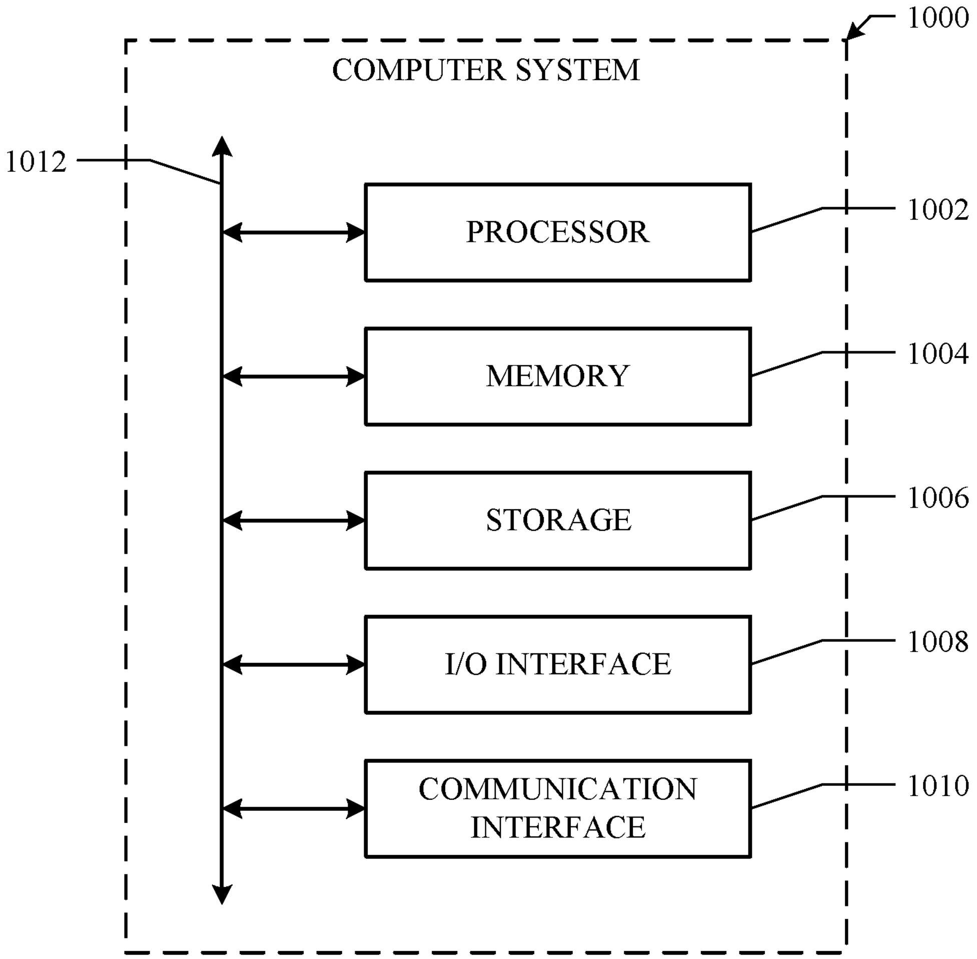
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

by one or more processors, receiving, at a social-networking system:

an identifier corresponding to a post item stored in the social-networking system;

information indicative of a plurality of coordinated user gestures input into a composition interface control, wherein the composition interface control comprises a plurality of interface targets each associated with a respective musical note;

information indicative of a target musical note associated with an interface target of each of the user gestures; and information indicative of a timing of each of the user gestures;

by the one or more processors, translating the plurality of coordinated user gestures into a musical composition by:

determining a duration of each of the user gestures;

determining a duration of each target musical note based on the duration of each of the user gestures; and recording each target musical note and a timing and duration of each target musical note, the timing of each target musical note corresponding to the timing of each of the user gestures, the musical composition comprising musical notation reflecting the musical note and timing data of each user gesture;

by the one or more processors, associating the musical composition with the post item; and by the one or more processors, in response to receiving a request for the post item, formatting the post item and a graphical representation of each note in the musical composition for display in a user interface control.

2. The method of claim 1, further comprising:

receiving, at the social-networking system:

a request to add to the musical composition; and a second plurality of coordinated user gestures input into the composition interface control;

translating the second plurality of coordinated user gestures into a second musical composition; and associating the second musical composition with the post item.

3. The method of claim 2, further comprising:

in further response to receiving the request for the post item, overlaying a graphical representation of each note in the second musical composition onto the graphical representation of the musical composition to display a combined composition.

4. The method of claim 3, wherein the user interface control for displaying the combined musical composition comprises separate staffs for each musical composition in the combined composition, and an indication of an author of each composition.

5. The method of claim 1, wherein the composition interface control comprises a selectable octave interface for modifying an octave that each musical note for each interface target is associated with.

6. The method of claim 1, wherein the composition interface control comprises a selectable instrument interface for modifying a display configuration of the interface targets to mimic a selected instrument.

7. The method of claim 6, wherein the selectable instrument interface further modifies acoustic properties of each musical note to mimic a characteristic sound associated with the selected instrument.

8. The method of claim 1, further comprising:

receiving, at the social-networking system, a user preference indicating whether the musical composition can be modified; and storing the user preference with the post item.

9. The method of claim 1, further comprising:

simulating performance of the musical composition;

recording the simulated performance; and in further response to receiving the request for the post item, transmitting the recording for simultaneous reproduction with display of the graphical representation of each note in the musical composition.

10. One or more computer-readable non-transitory storage media embodying software that is operable when executed to:

receive, at a social-networking system:

an identifier corresponding to a post item stored in the social-networking system;

information indicative of a plurality of coordinated user gestures input into a composition interface control, wherein the composition interface control comprises a plurality of interface targets each associated with a respective musical note information indicative of a target musical note associated with an interface target of each of the user gestures; and information indicative of a timing of each of the user gestures;

translate the plurality of coordinated user gestures into a musical composition by:

determining a duration of each of the user gestures;

determining a duration of each target musical note based on the duration of each of the user gestures; and recording each target musical note and a timing and duration of each target musical note, the timing of each target musical note corresponding to the timing of each of the user gestures, the musical composition comprising musical notation reflecting the musical note and timing data of each user gesture;

associate the musical composition with the post item; and in response to receiving a request for the post item, format the post item and a graphical representation of each note in the musical composition for display in a user interface control.

11. The non-transitory storage media of claim 10, wherein the software is further operable to:

receive, at the social-networking system:

a request to add to the musical composition; and a second plurality of coordinated user gestures input into the composition interface control;

translate the second plurality of coordinated user gestures into a second musical composition; and associate the second musical composition with the post item.

12. The non-transitory storage media of claim 11, wherein the software is further operable to:

in further response to receiving the request for the post item, overlaying a graphical representation of each note in the second musical composition onto the graphical representation of the musical composition to display a combined composition.

13. The non-transitory storage media of claim 12, wherein the user interface control for displaying the combined musical composition comprises separate staffs for each musical composition in the combined composition, and an indication of an author of each composition.

14. The non-transitory storage media of claim 10, wherein the composition interface control comprises a selectable octave interface for modifying an octave that each musical note for each interface target is associated with.

15. The non-transitory storage media of claim 10, wherein the composition interface control comprises a selectable instrument interface for modifying a display configuration of the interface targets to mimic a selected instrument.

16. The non-transitory storage media of claim 15, wherein the selectable instrument interface further modifies acoustic properties of each musical note to mimic a characteristic sound associated with the selected instrument.

17. The non-transitory storage media of claim 10, wherein the software is further operable to:

receive, at the social-networking system, a user preference indicating whether the musical composition can be modified; and store the user preference with the post item.

18. The non-transitory storage media of claim 10, wherein the software is further operable to:

simulate performance of the musical composition;

record the simulated performance; and in further response to receiving the request for the post item, transmit the recording for simultaneous reproduction with display of the graphical representation of each note in the musical composition.

19. A system comprising:

one or more processors; and one or more computer-readable non-transitory storage media coupled to one or more of the processors and comprising instructions operable when executed by one or more of the processors to cause the system to:

receive, at a social-networking system:

an identifier corresponding to a post item stored in the social-networking system;

information indicative of a plurality of coordinated user gestures input into a composition interface control, wherein the composition interface control comprises a plurality of interface targets each associated with a respective musical note;

information indicative of a target musical note associated with an interface target of each of the user gestures; and information indicative of a timing of each of the user gestures;

translate the plurality of coordinated user gestures into a musical composition by:

determining a duration of each of the user gestures;

determining a duration of each target musical note based on the duration of each of the user gestures; and recording each target musical note and a timing and duration of each target musical note, the timing of each target musical note corresponding to the timing of each of the user gestures, the musical composition comprising musical notation reflecting the musical note and timing data of each user gesture;

associate the musical composition with the post item; and in response to receiving a request for the post item, format the post item and a graphical representation of each note in the musical composition for display in a user interface control.

20. The system of claim 19, wherein the instructions are further operable when executed by one or more of the processors to cause the system to:

receive, at the social-networking system:

a request to add to the musical composition; and a second plurality of coordinated user gestures input into the composition interface control;

translate the second plurality of coordinated user gestures into a second musical composition; and associate the second musical composition with the post item.

* * * * *